United States Patent
Collins, III et al.

(10) Patent No.: US 7,239,511 B2
(45) Date of Patent: Jul. 3, 2007

(54) TOOLLESS HAND ACTUATED DEVICE RECEIVER FOR RETAINING A DEVICE IN A COMPUTER

(75) Inventors: Joel W. Collins, III, Raleigh, NC (US); Timothy S. Farrow, Apex, NC (US); Brian H. Leonard, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 191 days.

(21) Appl. No.: 10/746,387

(22) Filed: Dec. 24, 2003

(65) Prior Publication Data

US 2005/0141188 A1    Jun. 30, 2005

(51) Int. Cl.
G06F 1/16    (2006.01)
(52) U.S. Cl. ..................... 361/685; 361/679
(58) Field of Classification Search ............. 361/608, 361/683, 686, 685, 679; 248/552, 553; 312/223.1–223, 312/32, 33, 34; 70/14, 57, 58, 59
See application file for complete search history.

(56) References Cited

U.S. PATENT DOCUMENTS

| | | | | |
|---|---|---|---|---|
| 4,420,905 A | * | 12/1983 | Kucharczyk | 49/192 |
| 4,982,203 A | * | 1/1991 | Uebbing et al. | 347/236 |
| 5,208,735 A | * | 5/1993 | Twachtmann et al. | 361/725 |
| 5,224,018 A | * | 6/1993 | Kobayashi | 361/685 |
| 5,446,618 A | * | 8/1995 | Tetsuya et al. | 361/683 |
| 5,526,226 A | * | 6/1996 | Katoh et al. | 361/680 |
| 5,668,696 A | * | 9/1997 | Schmitt | 361/685 |
| 5,764,477 A | * | 6/1998 | Ohgami et al. | 361/683 |
| 5,765,933 A | * | 6/1998 | Paul et al. | 312/332.1 |
| 5,767,445 A | * | 6/1998 | Wu | 174/52.1 |
| 6,075,693 A | * | 6/2000 | Leman | 361/683 |
| 6,102,721 A | * | 8/2000 | Seto et al. | 439/160 |
| 6,246,572 B1 | * | 6/2001 | Myers et al. | 361/683 |
| 6,354,680 B1 | * | 3/2002 | Lin et al. | 312/223.2 |
| 6,370,022 B1 | | 4/2002 | Hooper et al. | 361/685 |
| 6,377,447 B1 | * | 4/2002 | Boe | 361/685 |
| 6,459,572 B1 | | 10/2002 | Huang et al. | 361/685 |
| 6,570,757 B2 | * | 5/2003 | DiFonzo et al. | 361/683 |
| 6,665,177 B2 | * | 12/2003 | Chen | 361/685 |
| 6,798,653 B2 | * | 9/2004 | Chen et al. | 361/685 |
| 6,804,111 B1 | * | 10/2004 | Williams et al. | 361/685 |
| 6,853,549 B2 | * | 2/2005 | Xu | 361/685 |
| 2003/0048604 A1 | * | 3/2003 | Chen | 361/685 |

FOREIGN PATENT DOCUMENTS

| | | |
|---|---|---|
| CH | SU 648445 | 2/1979 |
| CH | SU 1073133 | 2/1984 |
| CH | SU 1120963 | 10/1984 |
| EP | 107538 | 9/1982 |
| JP | 902464116 | 9/1990 |

* cited by examiner

*Primary Examiner*—Jayprakash Gandhi
*Assistant Examiner*—Ingrid Wright
(74) *Attorney, Agent, or Firm*—Anthony M. Del Zoppo, III; Driggs, Hogg & Fry Co., LPA

(57) ABSTRACT

A computer system having an opening configured to accept a device, the device assembly including at least one engagement surface. 3The computer system comprises a locking mechanism disposed in the opening to releasably latch the device assembly in the opening at a preselected position. The latching mechanism includes a hand actuated assembly movable in the opening for releasably engaging the engagement surface of the device assembly when the device assembly is located in the opening. The invention also contemplates the combination of the device assembly and the computer.

20 Claims, 2 Drawing Sheets

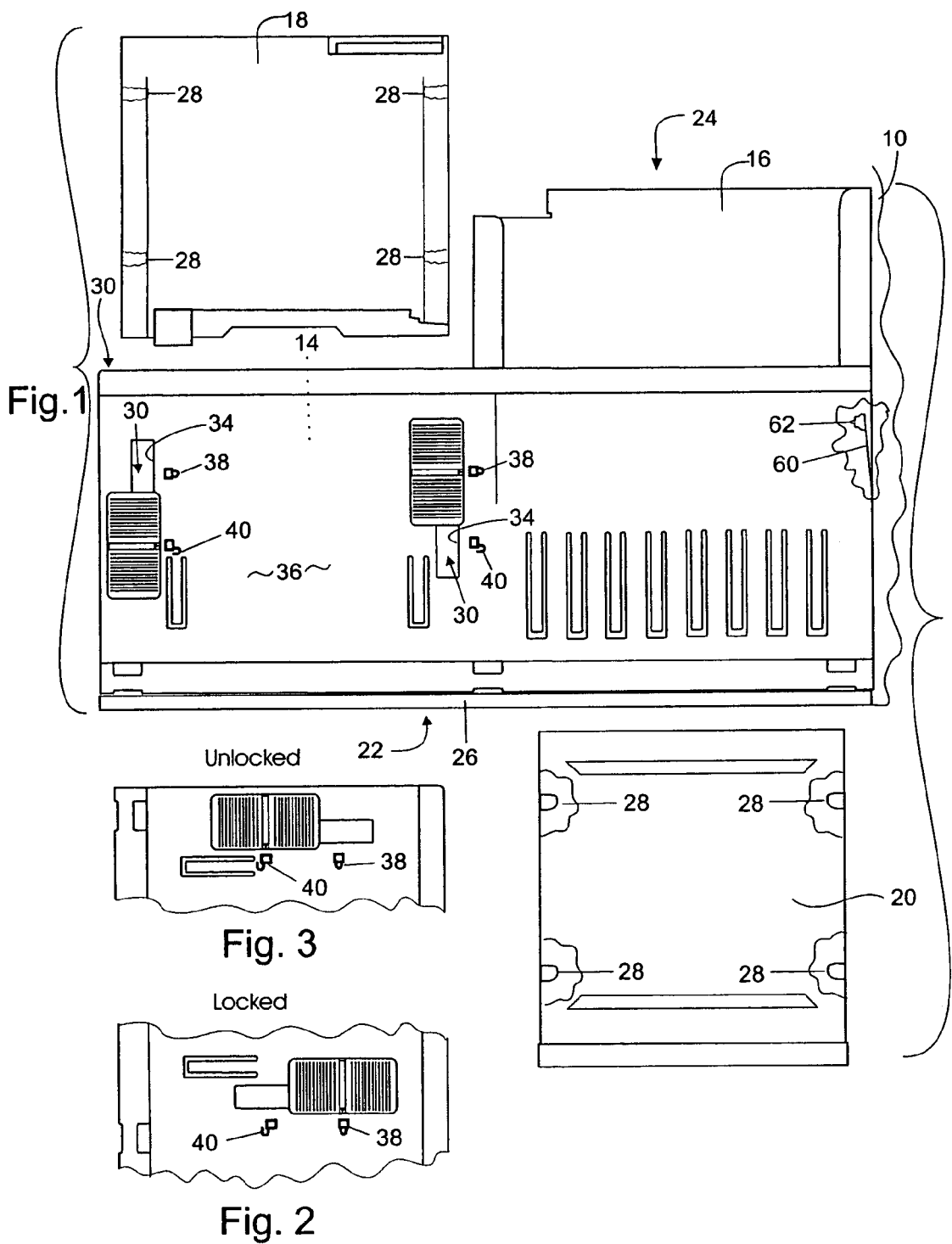

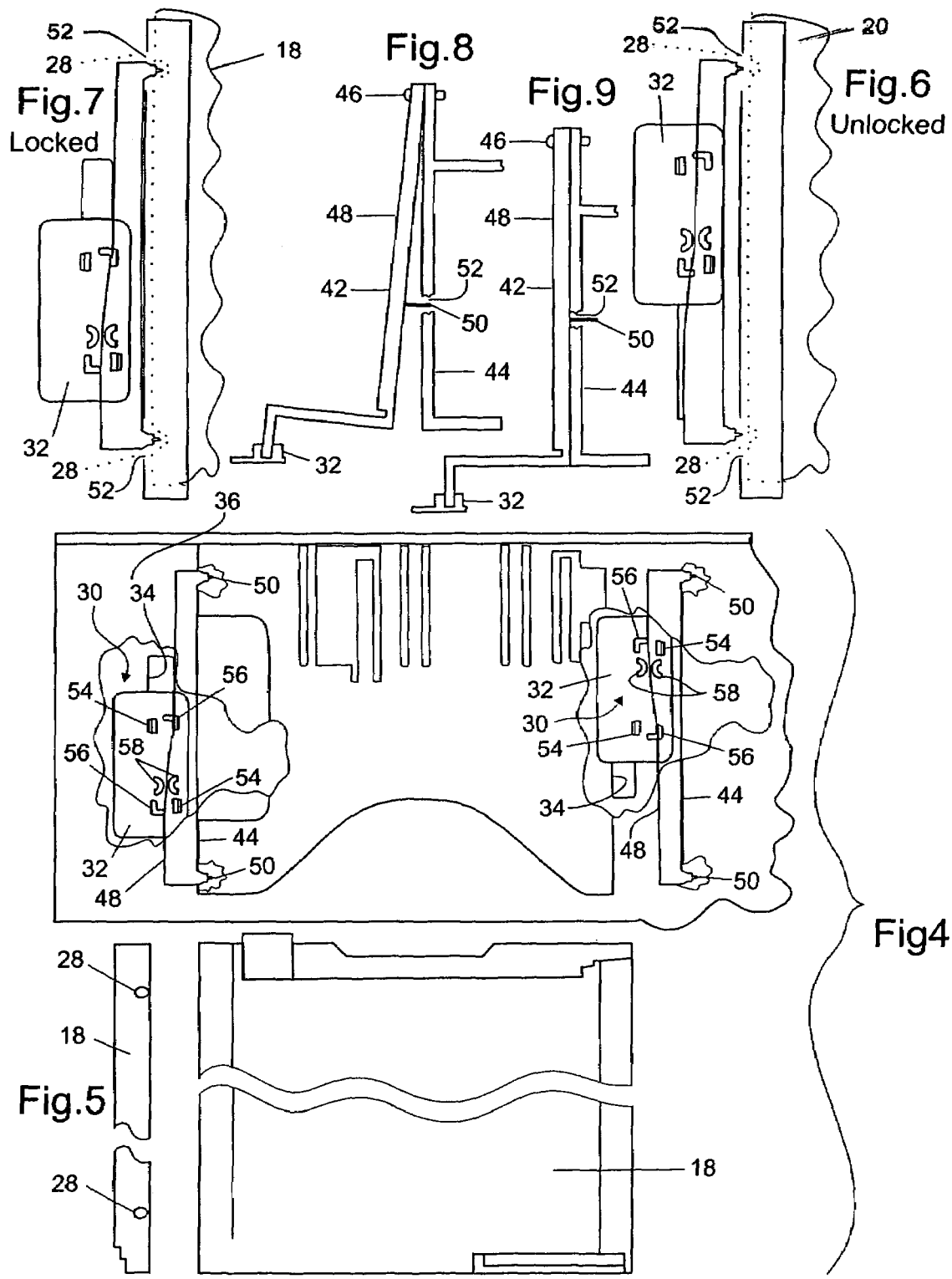

TOOLLESS HAND ACTUATED DEVICE RECEIVER FOR RETAINING A DEVICE IN A COMPUTER

FIELD OF THE INVENTION

The present invention relates generally to a device receiver for retaining a device in a computer, and more particularly to a toolless hand actuated device receiver for retaining a device assembly in a computer, and the resulting combination.

BACKGROUND OF THE INVENTION

According to conventional prior art practice, devices, both hard discs and floppy discs, but especially floppy discs and optical discs, are retained in a computer by screws or other fastening devices. Thus, assembly, servicing and upgrading of a computer has required the use of tools to perform these functions. While the end result is generally satisfactory, nevertheless there is a certain amount of skill required, as well as the other drawbacks normally attendant to the use of separate fastening devices for the attachment of component parts to a base part to form an assembly of parts. Thus, it would be desirable to provide a system in which devices can be easily mounted in and removed from computers without the need of using tools.

SUMMARY OF THE INVENTION

A computer system is provided having an opening configured to accept a device, the device assembly including at least one engagement surface. The computer system comprises a locking mechanism disposed in the opening to releasably latch the device assembly in the opening at a preselected position. The latching mechanism includes a hand actuated assembly movable in the opening for releasably engaging the engagement surface of the device assembly when the device assembly is located in the opening. The invention also contemplates the combination of the device assembly and the computer.

BRIEF DESCRIPTION OF THE DRAWINGS

FIG. 1 is a top plan view of a computer having a device receiver with a 3½ inch floppy device assembly and a 5¼ inch device assembly ready to be inserted therein according to this invention;

FIG. 2 is detailed top plan view of the slider in the unlocked position;

FIG. 3 is a detailed top plan view of the slider in the locked position;

FIG. 4 is a bottom plan view, with parts broken away for clarity, of a portion of the device receiver with a 3½ inch floppy device assembly ready for insertion;

FIG. 5 is a side elevational view of a 3½ inch floppy device assembly;

FIG. 6 is a detail view of the locking mechanism in the unlocked position;

FIG. 7 is a detail view of the locking mechanism in the locked position;

FIG. 8 is an end elevational view of the locking mechanism in the unlocked position; and FIG. 9 is an end elevational view of the locking mechanism in the locked position.

DESCRIPTION OF THE PREFERRED EMBODIMENTS

Referring now to the drawings, and for the present to FIG. 1, a computer system is shown generally at 10, having a device receiver 12, which in the disclosed embodiment has side by side bays 14, 16 for receiving 3½ inch and 5¼ inch device assemblies 18, 20, respectively. It is to be understood that this arrangement of device assemblies is only illustrative of many different arrangements of device assemblies and different device assemblies that could be used. The device receiver 12 includes a front 22 and a rear 24. In the disclosed embodiment, the 3½ inch device assembly 18 inserts into bay 14 from the rear 24 and the 5¼ inch device assembly inserts into bay 16 from the front 22. A bezel 26 acts as a stop to position the 3½ inch device assembly 18, and the 5¼ inch device assembly is detented into position, as will be described presently.

Each of the device assemblies 18, 20 has two screw holes 28 in an engagement surface in each side thereof. These are conventional and, in the prior art, for the purpose of receiving a screw therein to hold the device assemblies 18, 20 in place as indicated earlier. These holes are made use of in this invention for toolless locking and detenting of the devices 18, 20 as will be described presently. A locking mechanism 30 (FIGS. 4, 6, 7, 8 and 9) for each device assembly 18, 20 is actuated by slider arm 32 movable in a slot 34. Cover member 36 of the device receiver has a locked icon 38 and an unlocked icon 40 embossed thereon and associated with each slider arm 32.

FIGS. 4, 6, 7, 8 and 9 show the locking mechanism 30 for each of the device assemblies 18, 20. Each of the locking assemblies 30 includes an "h" shaped camming member 42 formed of spring steel connected to side rail 44 of one of the bays 14, 16 by fasteners, one of which is shown at 46. Each camming member 42 includes a cam surface 48, and a pair of fingers 50, each finger being aligned with an opening 52 in side rail 44 and movable into and out of the openings 52, as shown in FIGS. 6-9, for locking and unlocking the respective device assembly 18, 20 in its respective bay 14,16. As can best be seen in FIGS. 4, 6 and 7, each slider arm 32 includes a retainer clip 54 to mount the slider arm 32 to the camming member 42, and spring rests 56 and spring guides 58 to act against cam surface 48 to move the fingers in and out of the openings 52, thus to provide locked and unlocked positions for the device assemblies 18, 20. The bay 16 for device assembly 20 includes a spring arm 60 having a finger 62 at the end thereof, which arm 60 projects into bay 16 to detent or secure the 5¼ inch device assembly in bay 16.

OPERTION

The operation of the device receiver 12 is as follows:

The slider arms 32 are each placed in the unlocked position which means that the fingers 50 are retracted from the bays 14, 16 and, thus, the device assemblies 18, 20 can be freely inserted into the bays 14, 16 without interference. The 3½ inch device assembly 18 is inserted from the rear 24 into bay 14 and pushed snugly against the bezel 26 to properly locate the device assembly 18. The slider arm 32 is then moved to the locked position, which will move the fingers 50 of the locking mechanism 30 through the openings 52 into screw holes 28 that align with the fingers 50 extending through the openings 52, thus locking the 3½ inch device assembly 18 in place in bay 14 without requiring the use of tools. To remove the 3½ inch device assembly, the slider arm 32 is moved to the unlocked position, which will move the fingers 50 out of the screw holes, allowing the 3½ inch device assembly to be removed.

The 5¼ inch device assembly 20 is inserted from the front 22, rather than the rear 24, again with the slider arm 32 in the unlocked position. The side of the 5¼ inch device assembly 20 pushes the arm 60 aside as the 5¼ inch device assembly 20 is inserted until the finger 62 on the end of spring arm 60 engages a screw hole 28 on that side of the 5¼ inch device assembly 20, which will properly locate the 5¼ inch device assembly 20 in bay 26. The slider arm 32 is moved to the unlocked position, moving the fingers 50 out of the screw hole 28, thus allowing the 5¼ inch device assembly 20 to be moved against the detent action of the spring arm 60 and finger 62.

The foregoing description of the exemplary embodiment of the invention has been presented for the purposes of illustration and description. It is not intended to be exhaustive or to limit the invention to the precise concept(s) disclosed. Many modifications and variations are possible in light of the above teaching. It is intended that the scope of the invention be limited, not with this detailed description, but rather by the claims appended hereto.

What is claimed is:

1. A device receiver having an opening configured to accept a disc device assembly,
   said disc device assembly including at least one engagement surface,
   said disc device receiver comprising a locking mechanism to lock said device assembly in said opening at a preselected position,
   said locking mechanism including a hand actuated assembly movable in said opening for releasably engaging said engagement surface of said device assembly when said disc device assembly is located in said opening, and
   wherein said engagement surface of said disc device assembly includes at least one depression, and said hand actuated locking mechanism includes at least one finger positioned and configured to reside in said at least one depression when said device assembly is in said locked position; and
   wherein said hand actuated locking mechanism includes a cam actuated device.

2. The invention as defined in claim 1 wherein said cam actuated device includes first and second ends, wherein said first end is mechanically affixed to a rail and the second end of said cam actuated device moves away from said rail when said hand actuated assembly is in an unlocked position, thereby retracting said finger out of said at least one depression.

3. The invention as defined in claim 1 wherein the hand actuated locking mechanism includes a slider arm.

4. The invention as defined in claim 2 wherein the cam device is spring actuated.

5. The invention as defined in claim 3 wherein the slider arm has a locked and an unlocked indicia associated therewith.

6. The invention as defined in claim 1 wherein said hand actuated locking mechanism includes a slider arm and a curved cam surface.

7. The invention as defined in claim 1 wherein a bezel is provided, and which bezel acts to locate said device assembly.

8. The invention as defined in claim 1 wherein a detent is provided to locate said device assembly.

9. In combination, a computer system including a disc device receiver having an opening configured to accept a disc device assembly, said device assembly including at least one engagement surface,
   said disc device receiver comprising a locking mechanism to lock said device assembly in said opening,
   said locking mechanism including a hand actuated assembly movable in said opening for releasably engaging said engagement surface of said disc device assembly when said disc device assembly is located in said opening, and
   wherein said engagement surface of said device assembly includes at least one depression, and said hand actuated locking mechanism includes at least one finger positioned and configured to reside in said at least one depression when said device assembly is in said locked position; and
   wherein said hand actuated locking mechanism includes a slider arm and a curved cam surface.

10. The invention as defined in claim 9 wherein said hand actuated locking mechanism includes a cam actuated device.

11. The invention as defined in claim 9 wherein the hand actuated locking mechanism includes a slider arm.

12. The invention as defined in claim 10 wherein the cam actuated device is spring actuated.

13. The invention as defined in claim 11 wherein the slider arm has a locked and an unlocked indicia associated therewith.

14. The invention as defined in claim 9 wherein said hand actuated assembly includes a first fixed end and a second moveable end that is movable between a first position in which said finger is disposed within said depression and a second position in which said finger is retracted from said depression.

15. The invention as defined in claim 9 wherein a bezel is provided, and which bezel acts to locate said device assembly.

16. The invention as defined in claim 9 wherein a detent is provided to locate said device assembly.

17. A system, comprising
    an opening configured to accept a disc device assembly,
    said disc device assembly including at least one engagement surface,
    said disc device receiver comprising a locking mechanism to lock said device assembly in said opening at a preselected position,
    said locking mechanism including a hand actuated assembly movable in said opening for releasably engaging said engagement surface of said device assembly when said disc device assembly is located in said opening, and
    wherein said engagement surface of said disc device assembly includes at least one depression, and said hand actuated locking mechanism includes a member that has at least one finger positioned and configured to reside in said at least one depression when said device assembly is in said locked position and a hand actuated arm that engages said member to engage said at least one finger in said at least one depression; and
    wherein a fastener connects a first end of said member to a rail and a second end of said member is positioned away from said rail when said hand actuated locking mechanism is in the unlocked position, thereby retracting said finger out of said at least one depression.

18. The system of claim 17, wherein said member having said at least one finger and said hand actuated arm is mounted to a rail of said device receiver, said rail has an opening, and said at least one finger moves through said opening and into said at least one depression when said device assembly is positioned into said locked position.

19. The system of claim 18, wherein the system is a computer.

20. The system of claim 17, wherein said second end of said member is positioned next to said rail when said hand actuated locking mechanism is in the locked position, thereby engaging said finger in said at least one depression.

* * * * *